R. HAEGER, W. SCHRANER AND P. HAEGER.
ICE CREAM CUTTING MACHINE.
APPLICATION FILED MAR. 24, 1919.

1,375,842.

Patented Apr. 26, 1921.

Witness:
Jas. E. Hutchinson

Inventors:
Richard Haeger, Wm. Schraner, Paul Haeger
By Milans & Milans Attorneys R. HAEGER, W. SCHRANER AND P. HAEGER.
ICE CREAM CUTTING MACHINE.
APPLICATION FILED MAR. 24, 1919.
1,375,842.
Patented Apr. 26, 1921.
2 SHEETS—SHEET 2.
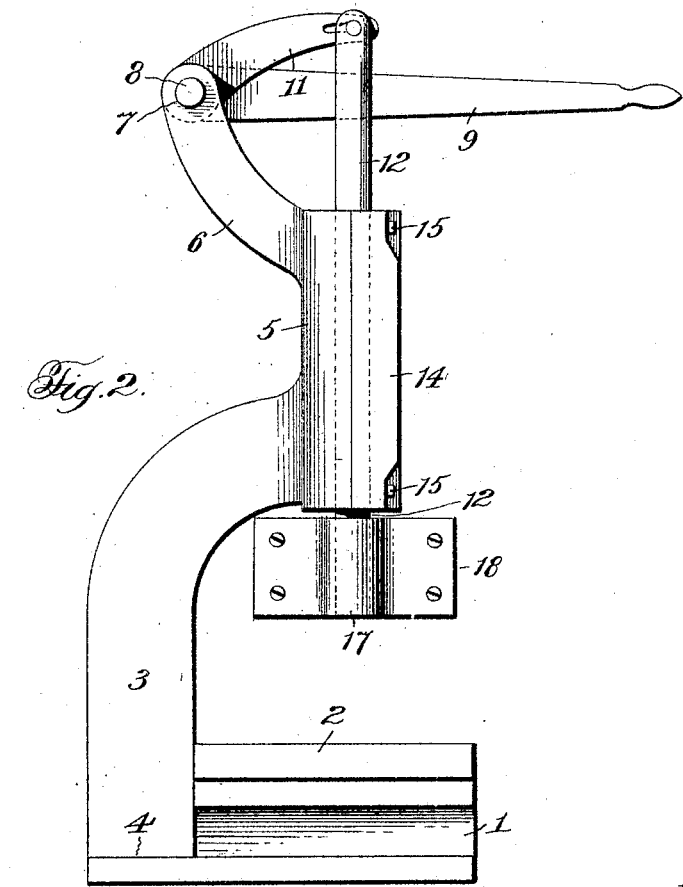
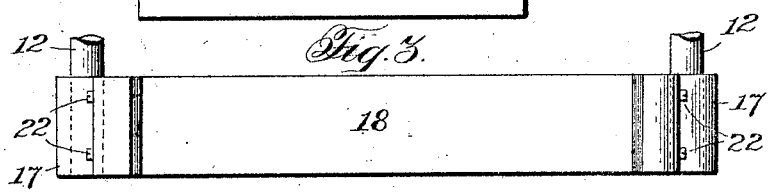
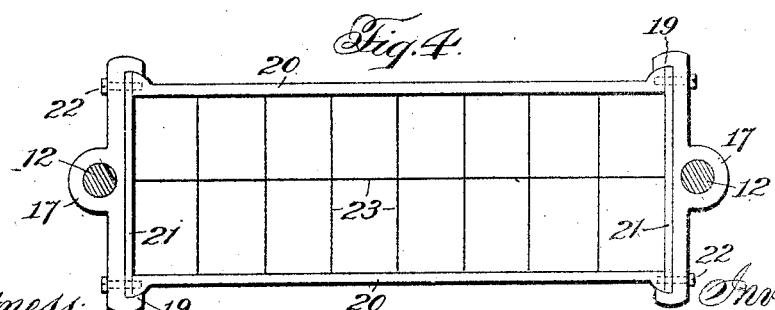

UNITED STATES PATENT OFFICE.

RICHARD HAEGER, WILLIAM SCHRANER, AND PAUL HAEGER, OF DETROIT, MICHIGAN.

ICE-CREAM-CUTTING MACHINE.

1,375,842.   Specification of Letters Patent.   Patented Apr. 26, 1921.

Application filed March 24, 1919. Serial No. 284,330.

*To all whom it may concern:*

Be it known that we, RICHARD HAEGER, WILLIAM SCHRANER, and PAUL HAEGER, residing at Detroit, in the county of Wayne and State of Michigan, have invented certain new and useful Improvements in Ice-Cream-Cutting Machines, of which the following is a specification, reference being had therein to the accompanying drawing.

The invention relates to improvements in ice cream cutting machines.

It is an object of the invention to provide an apparatus of this character for cutting in a single operation a large mass, or block of ice cream into a plurality of slices all to a uniform determined size, thus eliminating the objectionable feature of having one slice larger than the other present when a mass is cut by hand.

The invention aims to provide an apparatus for this purpose that is inexpensive to manufacture, utilizing a minimum number of parts and simple in operation and construction, yet highly efficient for rapidly and accurately cutting large bricks of ice cream in uniform slices of a determined size.

In the accompanying drawings, we have illustrated the preferred embodiment of the invention, but this is only shown for the purpose of illustration and we wish it to be understood that many changes and modifications may be made without departing from the spirit thereof.

In the drawings:

Figure 1 discloses a front elevation.

Fig. 2 is a side elevation.

Figs. 3 and 4 are detail views.

Figure 1:
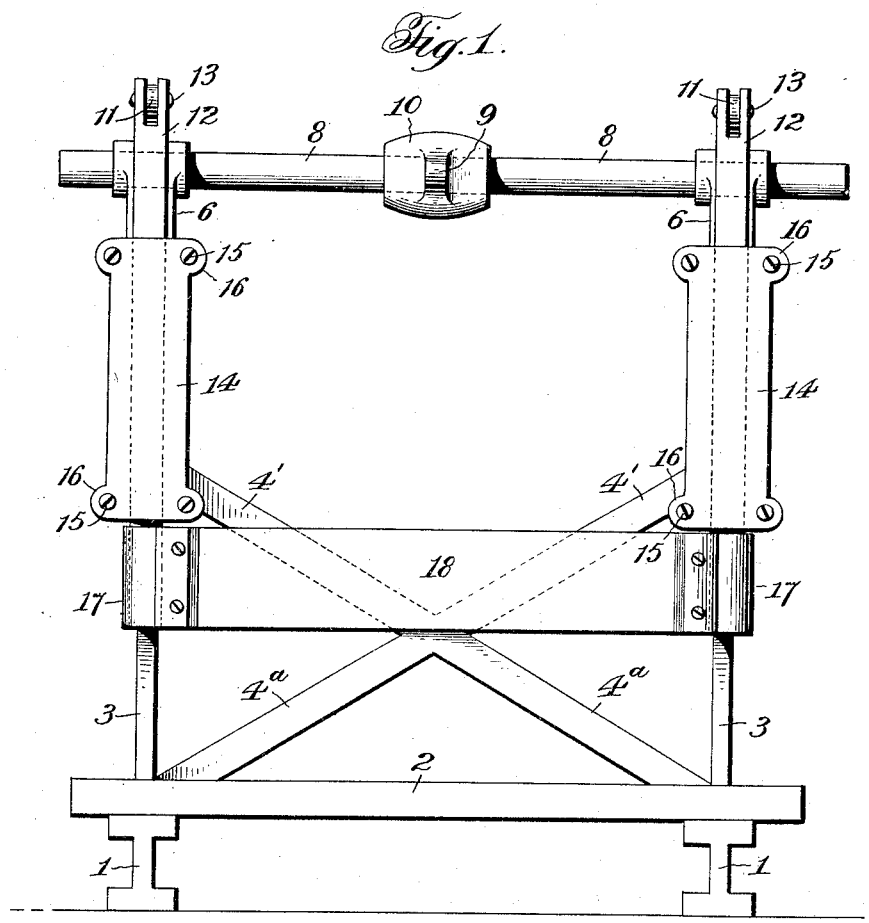

Referring now more particularly to the drawings wherein like reference characters indicate corresponding parts, the numeral 1 designates a pair of spaced supports shown as being of substantially an I-beam construction having arranged thereon a base or platform 2 upon which a mass or brick of ice cream is placed. The platform 2 extends outwardly to a point flush with the outer edges of the supports 1, while the inward position of the base is limited by the upstanding members 3 positioned on the support 1 by cutting away a portion of each of said supports near their end to provide flat seating surfaces 4 for the members, the members extending upwardly at each side of the apparatus and carrying integral guide forming portions 5 overlying the base 2. To strengthen the apparatus, cross reinforcing members 4' and 4ᵃ are employed, the member 4ᵃ being connected with one of the beams 1 at its lower end, and secured to the opposite member 3 at its upper end, the other reinforcing element 4' being connected to the right hand beam 1 and to the left hand member 3. This merely serves to strengthen or support the parts of the apparatus and any other appropriate means can be used. The members 3 extend upwardly a slight distance and are then curved inwardly over said base to permit the bearing members 5 to overlie the same. The beams are each provided at the upper ends of the bearing members 5 with rearwardly extending inclined arms 6 having apertures 7 at their ends receiving and supporting a shaft 8 extending the entire length of the machine. This shaft 8 is mounted for rotary movement within the aperture 7 of the arms 6 and is oscillated or rotated by means of a handle 9 fixedly secured to the shaft by the rigid attachment of its collar 10 thereto and adapted to rotate the shaft in consonance with the movement of the operating handle 9. It will be observed that this handle extends forwardly a considerable distance beyond the vertical plane of the base 2 to be located in a convenient position for the operator.

Mounted to rotate with the shaft 8 are a pair of separated levers 11, preferably keyed to the shaft and of a slightly curved formation, the outer end of each lever overlying the base 2 and being connected with a vertically disposed rod 12 by means of a pivot pin 13. There are two of these levers shown, and also a pair of rods 12, one for each lever, the rods having bifurcated ends receiving the ends of the levers 11 at a point where they are attached to said rods. Upon an operation of the handle 9 the shaft 8 is, of course, rotated, and this rotary movement imparts to the rods 12, a reciprocating movement through the medium of the levers 11 which are keyed to the shaft and move therewith. During their reciprocating movement the rods 12 are prevented from moving in a horizontal direction by reason of the bearing caps 14 having channels passing therethrough and forming with the bearing members 5 a suitable guide for maintaining the rods 12 in position during their reciprocation. These caps are relatively long and are secured to the guide members by the fastening bolts 15 extending through ears 16 therein and engaging the body portions of the bearing members 5.

At their lower ends the rods 12 are adapted to enter suitable sockets 17 disposed in the center of clamping members 18, each rod, of course, being connected to a clamping member.

The clamping members 18 have substantial dove-tailed slots 19 therein receiving and securing in position the side and end walls 20 and 21, respectively, of the cutter frame, suitable fastening pins 22 passing through the clamping members and the ends and offset side portions of the frame to firmly hold the same in position. The frame is adapted to receive a plurality of cutters 23 spaced an equal distance apart and firmly held in their determined position by means of the side and end members of the cutting frame and the clamping devices connected therewith. The positioning of the cutters, of course, determines the size the slices of ice cream is to be, but all cutters are separated a uniform distance so that the slices will also be of a uniform size. It will be understood that the size of the slices is determined by the distance the knives are separated and of course these knives can be arranged in any manner that the occasion should require. It will be seen that the raising and lowering of the rods 12 will correspondingly raise and lower the cutter frame carrying with it the cutters. The operation of the device may be briefly stated as follows:

A mass or a large brick of ice cream is placed upon the bed or base 2, the handle 9 being grasped by the operator and lifted upwardly to rotate the shaft 8, elevate the links 11 and move the rods 12 in a vertical direction to raise the cutter frame to the position shown in Fig. 1. When in this position, the mass of ice cream is placed upon the base, the cutters 23 having been positioned so that they will be spaced apart a distance to cut bricks of a determined size, and then the operator moves the handle 9 downwardly causing a rotation of the shaft 8 and a depression of the links 11 and rods 12, forcing the cutters in the frame into contact with the mass of cream supported upon the base 2 and dividing the same into slices of a regulated uniform size. This operation is very rapid, requiring but a single manipulation of the handle 9 to divide a large mass of cream into separate blocks of a predetermined, regulated size, utilizing to accomplish this desired result a mechanism, involving only a few parts, that is simple in operation and of an inexpensive nature. After dividing a mass of cream into slices of equal size an operation of the handle 9 lifts the cutters upwardly until the upward movement is stopped by the members 3 and the guides 5, whereupon the slices are removed from the base 2 and a new mass or brick placed thereon. It will be observed that by curving the members 3 inwardly a guide is formed to maintain the cutters and the cutter frame in a proper position over the base during the vertical movement of the cutters. The members 3 are then provided with the portions 6 extending rearwardly and upwardly therefrom to constitute a support for the shaft 8 that is connected with the operating rods for the cutters through the medium of the links 11 permitting a material leverage to be acquired upon the operation of the operating handle 9.

What we claim is:

1. A device of the character described comprising a base, upstanding members formed on one edge of the base with their upper ends curved inwardly to overlie the base, vertically extending guides formed on the curved ends of the upstanding members, rods slidably mounted in the guides, arms formed on the guides, a shaft rotatably supported by the arms, means connecting the shaft and rods, cutting blades secured to the lower ends of the rods, and means for rotating the shaft.

2. A device of the character described comprising spaced beams, a platform supported on the beams, an upstanding member secured to one end of each beam and the upper end thereof curved inwardly to overlie the platform, a vertical guide formed on the curved end of each upstanding member, a detachable plate secured to each guide, a rod operating in each guide and held in vertical position by the detachable plate, an arm formed on each guide, a shaft supported by the arms, means connecting the shaft and vertical rods, means for oscillating the shaft, a frame secured to the lower ends of the vertical rods, and blades secured in the frame.

3. A device of the character described comprising spaced beams, a platform supported on the beams an upstanding member secured to one end of each beam and the upper end thereof curved inwardly to overlie the platform, a vertical guide formed on the curved end of each upstanding member, a detachable plate secured to each guide, a rod operating in each guide and held in vertical position by the detachable plate, an arm formed on each guide, a shaft supported by the arms, means connecting the shaft and vertical rods, means for oscillating the shaft, a frame, eyes secured to the frame and adapted to receive the ends of the vertical rods, and blades secured in the frame.

4. A device of the character described comprising spaced beams, a platform supported on the beams, an upstanding member secured to one end of each beam and the upper end thereof curved inwardly to overlie the platform, a vertical guide formed on the curved end of each upstanding member, a detachable plate secured to each guide, a rod operating in each guide and held in vertical position by the detachable plate, an arm formed on each guide, a shaft supported by the arms, means connecting the shaft and vertical rods, a frame, detachable clamps secured to the frame and provided with eyes to receive the ends of the vertical rods, and blades secured in the frame.

In testimony whereof we hereunto affix our signatures in the presence of two witnesses.

RICHARD HAEGER.
WILLIAM SCHRANER.
PAUL HAEGER.

Witnesses:
JOHN C. SPAULDING,
JOHN C. WINTER.